(12) United States Patent
Morita et al.

(10) Patent No.: US 11,557,932 B2
(45) Date of Patent: Jan. 17, 2023

(54) COIL SUBSTRATE AND MOTOR COIL SUBSTRATE

(71) Applicant: IBIDEN CO., LTD., Gifu (JP)

(72) Inventors: Haruhiko Morita, Ogaki (JP); Hitoshi Miwa, Ogaki (JP); Shinobu Kato, Ogaki (JP); Toshihiko Yokomaku, Ogaki (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 0 days.

(21) Appl. No.: 17/407,900

(22) Filed: Aug. 20, 2021

(65) Prior Publication Data
US 2022/0069657 A1 Mar. 3, 2022

(30) Foreign Application Priority Data
Aug. 25, 2020 (JP) .............................. JP2020-141405

(51) Int. Cl.
*H02K 3/26* (2006.01)

(52) U.S. Cl.
CPC ........... *H02K 3/26* (2013.01); *H02K 2203/03* (2013.01)

(58) Field of Classification Search
CPC .................................. H02K 3/00; H02K 3/26
See application file for complete search history.

(56) References Cited

U.S. PATENT DOCUMENTS

| 4,883,981 A * | 11/1989 | Gerfast ..................... H02K 3/47 310/46 |
| 2004/0155747 A1* | 8/2004 | Reinicke ................ H02K 33/12 336/200 |
| 2011/0140564 A1* | 6/2011 | Nomura ................ H01F 41/041 336/200 |

FOREIGN PATENT DOCUMENTS

| CN | 102187552 | * | 9/2011 | ............... H02K 3/26 |
| JP | 2019-140762 A | | 8/2019 | |
| JP | 2020089207 | * | 2/2020 | ............... H02K 3/26 |

* cited by examiner

*Primary Examiner* — Tran N Nguyen
(74) *Attorney, Agent, or Firm* — Oblon, McClelland, Maier & Neustadt, L.L.P.

(57) ABSTRACT

A coil substrate includes a flexible substrate having a first end and a second end on the opposite side with respect to the first end, and coils formed on the flexible substrate in substantially one row between the first end and the second end of the flexible substrate such that each of the coils has a center space and wirings surrounding the center space. The wirings in each of the coils include parallel wirings formed substantially parallel to a row direction extending from the first end toward the second end and perpendicular wirings formed substantially perpendicular to the row direction, and the coils are formed such that a thickness of the perpendicular wirings is greater than a thickness of the parallel wirings.

20 Claims, 2 Drawing Sheets

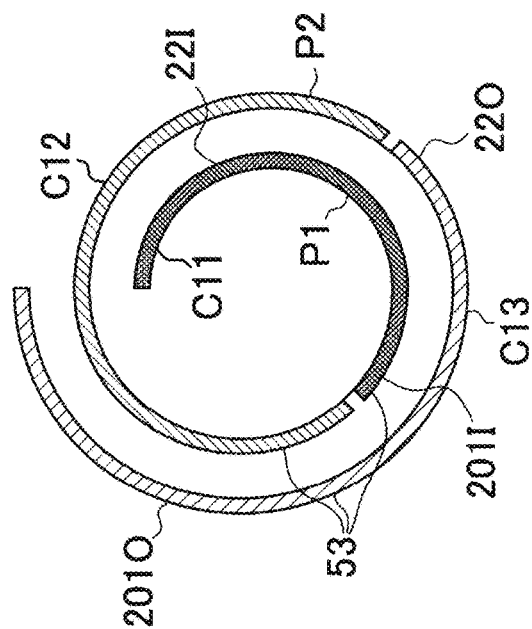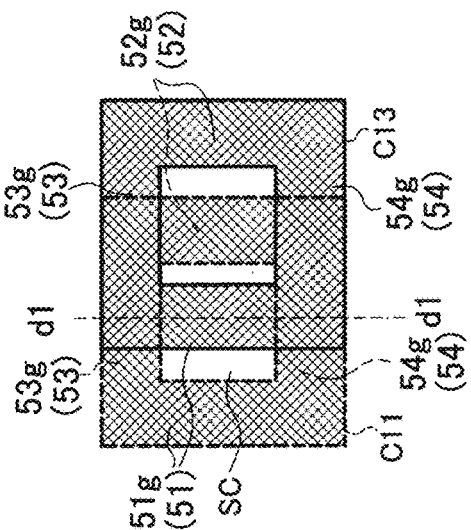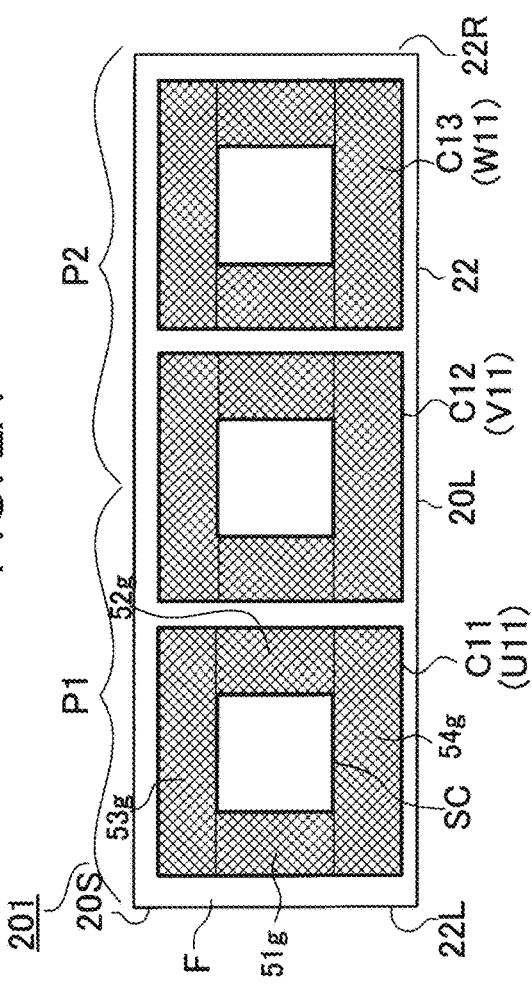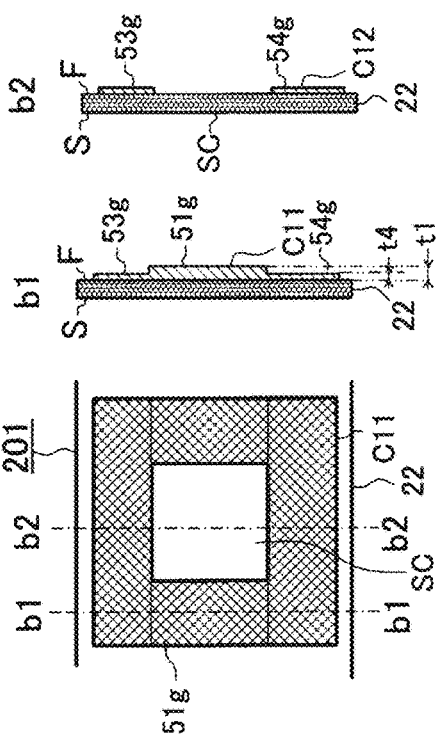

COIL SUBSTRATE AND MOTOR COIL SUBSTRATE

CROSS-REFERENCE TO RELATED APPLICATIONS

The present application is based upon and claims the benefit of priority to Japanese Patent Application No. 2020-141405, filed Aug. 25, 2020, the entire contents of which are incorporated herein by reference.

BACKGROUND OF THE INVENTION

Field of the Invention

The present invention relates to a coil substrate and a motor coil substrate.

Description of Background Art

Japanese Patent Application Laid-Open Publication No. 2019-140762 describes a tubular motor coil substrate. The entire contents of this publication are incorporated herein by reference.

SUMMARY OF THE INVENTION

According to one aspect of the present invention, a coil substrate includes a flexible substrate having a first end and a second end on the opposite side with respect to the first end, and coils formed on the flexible substrate in substantially one row between the first end and the second end of the flexible substrate such that each of the coils has a center space and wirings surrounding the center space. The wirings in each of the coils include parallel wirings formed substantially parallel to a row direction extending from the first end toward the second end and perpendicular wirings formed substantially perpendicular to the row direction, and the coils are formed such that a thickness of the perpendicular wirings is greater than a thickness of the parallel wirings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A illustrates a coil substrate according to an embodiment of the present invention;

FIG. 2B is a plan view of a coil according to an embodiment of the present invention;

FIG. 2C illustrates cross sections of a coil according to an embodiment of the present invention;

FIG. 2D illustrates overlapping of coils according to an embodiment of the present invention;

FIG. 2E illustrates a cross section of overlapping coils according to an embodiment of the present invention; and FIG. 2F is a schematic cross-sectional view of the motor coil substrate according to an embodiment of the present invention.

DETAILED DESCRIPTION OF THE EMBODIMENTS

Figure 1A:
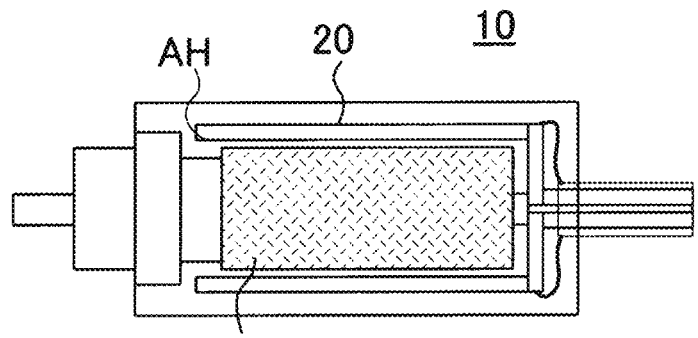
FIG. 1A is a schematic diagram of a motor according to an embodiment of the present invention.

Embodiments will now be described with reference to the accompanying drawings, wherein like reference numerals designate corresponding or identical elements throughout the various drawings.

A coil substrate 201 illustrated in FIG. 2A is prepared. The coil substrate 201 is formed to include: a flexible substrate 22 having a first surface (F) and a second surface (S) on the opposite side with respect to the first surface (F); and coils (C) (C11, C12, C13) on the first surface (F) of the flexible substrate 22. The coils on the first surface (F) are referred to as on-first-surface coils (CF). The coil substrate 201 can have coils (C) on the second surface (S). The coils on the second surface (S) are referred to as on-second-surface coils (CS).

Figure 1B:
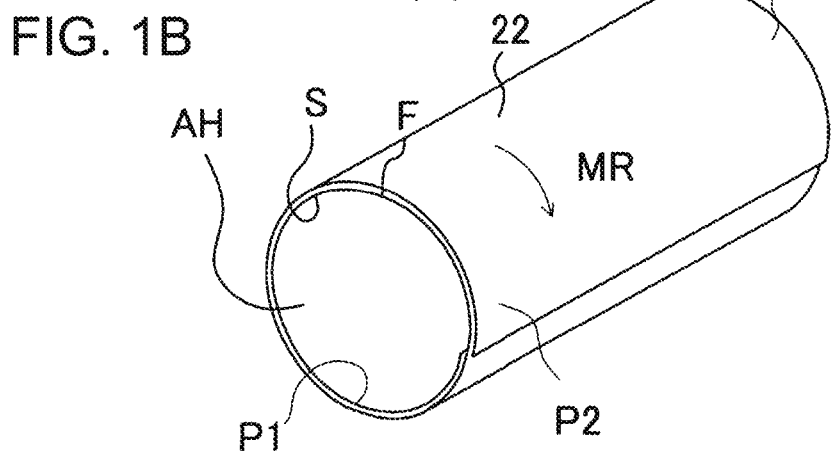
FIG. 1B is a schematic diagram of a motor coil substrate according to an embodiment of the present invention.

By winding the coil substrate 201, a motor coil substrate 20 illustrated in FIG. 1B is obtained. For example, the coil substrate 201 is wound in a tubular shape. The motor coil substrate 20 is wound around a hollow space (AH). For example, the motor coil substrate 20 has a tubular shape. The number of windings (N) is 2 or more and 5 or less. FIG. 1B is a schematic diagram.

As illustrated in FIG. 1A, a motor 10 is obtained by positioning a magnet 48 inside the motor coil substrate 20. FIG. 1A is a schematic diagram. The motor coil substrate 20 is positioned around the magnet 48 via the hollow space (AH). An example of the motor 10 is a brushless motor. In a first embodiment, the magnet 48 rotates. However, it is also possible that the motor coil substrate 20 rotates.

As illustrated in FIG. 2A, the flexible substrate 22 preferably has short sides (20S) and long sides (20L). The flexible substrate 22 has one end (22L) and the other end (22R) on the opposite side with respect to the one end (22L). One of the short sides (20S) also serves as the one end (22L). The coils (C) (C11, C12, C13) are formed along the long sides (20L) of the flexible substrate 22. The coils (C) are formed in one row from the one end (22L) to the other end (22R) of the flexible substrate 22. A direction from the one end (22L) toward the other end (22R) is a row direction. The first coil (C11) (U11) is a U-phase coil. The second coil (C12) (V11) is a V-phase coil. The third coil (C13) (W11) is a W-phase coil. The U-phase coil, the V-phase coil and the W-phase coil are formed in the order of the U-phase coil (U11), the V-phase coil (V11), and the W-phase coil (W11), and the coil (C) closest to the one end (22L) is the U-phase coil (U11). The number of the coils (C) is a multiple (M) (number M) of 3. In the example of FIG. 2A, the number of the coils is 3.

The coil substrate 201 is formed of a single flexible substrate 22. The flexible substrate 22 forming the coil substrate 201 is divided into multiple portions (P). Therefore, the coil substrate 201 is also divided into multiple portions (P). The coil substrate 201 is formed of multiple portions (P), and the number of the portions (P) is N. The portions (P) forming the coil substrate 201 are formed from the one end (22L) to the other end (22R). The first portion (P1) includes the one end (22L) of the flexible substrate 22. The second portion (P2) is next to the first portion (P1). For example, N is the number of windings of the flexible substrate 22. The N-th portion (PN) includes the other end (22R) of the flexible substrate 22.

In the example of FIG. 2A, the number of the portions (P) is 2. The coil substrate 201 of FIG. 2A is formed of the first portion (P1) and the second portion (P2). The first coil (C11), the second coil (C12) and the third coil (C13) are formed in the coil substrate 201. The first coil (C11) is the first on-first-surface coil, the second coil (C12) is the second on-first-surface coil, and the third coil (C13) is the third on-first-surface coil.

The multiple coils (C) formed on the flexible substrate 22 are simultaneously formed. For example, the multiple coils (C) are formed on the flexible substrate 22 using a common alignment mark. Therefore, positions of the coils (C) are related to each other.

The coils (C) of the embodiment are formed using a technology for a printed wiring board. The wirings (w) forming the coils (C) are formed by plating. Or, the wirings (w) forming the coils (C) are formed by etching a copper foil. The wirings (w) forming the coils (C) are formed using a semi-additive method, an M-Sap method, or a subtractive method.

The wirings (w) forming the coils (C) are formed using a technology for a printed wiring board. Therefore, a cross-sectional shape of each of the wirings (w) is substantially rectangular. According to the embodiment, a space factor of the coils can be increased.

Figure 1C:
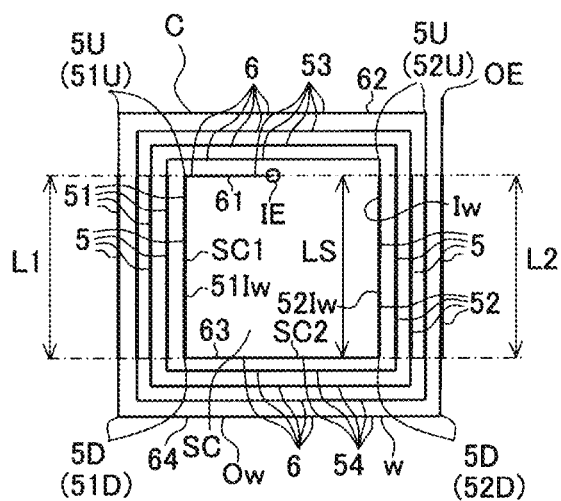
FIGS. 1C and 1D are plan views of a coil according to an embodiment of the present invention.

FIG. 1C illustrates an example of a coil (C). The coil (C) is formed of a center space (SC) and wirings (w) surrounding the center space (SC). The wirings (w) have an outer end (OE) and an inner end (IE). The wirings (w) are formed between the outer end (OE) and the inner end (IE). The wirings (w) forming the coil (C) are formed in a spiral shape. The center space (SC) is surrounded by an innermost wiring among the wirings (w) forming the coil (C). Among the multiple wirings (w), an innermost wiring (w) is referred to as an inner side wiring (Iw). An outermost wiring (w) is referred to as an outer side wiring (Ow).

As illustrated in FIG. 2A, the coils (C) are formed in substantially one row between the one end (22L) and the other end (22R). The direction from the one end (22L) toward the other end (22R) is the row direction.

As illustrated in FIG. 1C, the wirings (w) include perpendicular wirings 5 that are substantially perpendicular to the row direction and parallel wirings 6 that are substantially parallel to the row direction. The perpendicular wirings 5 include first wirings 51 and second wirings 52. The first wirings 51 and the second wirings 52 oppose each other via the center space (SC). The parallel wirings 6 include third wirings 53 and fourth wirings 54. The third wirings 53 and the fourth wirings 54 oppose each other via the center space (SC). When there are multiple first wirings 51, a first wiring 51 in contact with the center space (SC) is an inner side first wiring (51Iw). When there are multiple second wirings 52, a second wiring 52 in contact with the center space (SC) is an inner side second wiring (52Iw). When a planar shape of the center space (SC) is rectangular, the center space (SC) has a first side (SC1) and a second side (SC2). The first side (SC1) is substantially parallel to the first wirings 51. A length (L1) of the inner side first wiring (51Iw) and a length of the first side (SC1) are equal to each other. A length (L2) of the inner side second wiring (52Iw) and the length of the first side (SC1) are equal to each other.

One first wiring 51 and one second wiring 52 are electrically connected by one third wiring 53 or one fourth wiring 54. One first wiring 51 and one second wiring 52 are directly connected by one third wiring 53. One first wiring 51 and one second wiring 52 are directly connected by one fourth wiring 54. The wirings (w) are formed by the first wirings 51, the second wirings 52, the third wirings 53 and the fourth wirings 54. The wirings (w) do not include wirings other than the first wirings 51, the second wirings 52, the third wirings 53, and the fourth wirings 54.

The third wirings 53 have a first side wall 61 and a second side wall 62 on the opposite side with respect to the first side wall 61. Among the first side wall 61 and the second side wall 62, the first side wall 61 is closer to the center space (SC).

The fourth wirings 54 have a third side wall 63 and a fourth side wall 64 on the opposite side with respect to the third side wall 63. Among the third side wall 63 and the fourth side wall 64, the third side wall 63 is closer to the center space (SC).

The perpendicular wirings 5 each have an upper end (5U) and a lower end (5D) on the opposite side with respect to the upper end (5U). The perpendicular wirings 5 each have one upper end (5U) and one lower end (5D). The upper ends (5U) can be obtained by cutting the wirings (w) in a plane containing the first side wall 61. The upper ends (51U) of the first wirings 51 are boundaries between the first wirings 51 and the third wirings 53. The upper ends (52U) of the second wirings 52 are boundaries between the second wirings 52 and the third wirings 53. The lower ends (5D) can be obtained by cutting the wirings (w) in a plane containing the third side wall 63. The lower ends (51D) of the first wirings 51 are boundaries between the first wirings 51 and the fourth wirings 54. The lower ends (52D) of the second wirings 52 are boundaries between the second wirings 52 and the fourth wirings 54. A planar shape of each of the coils (C) is substantially rectangular.

The perpendicular wirings 5 have a thickness larger than that of the parallel wirings 6. The first wirings 51 and the second wirings 52 have a thickness larger than that of the third wirings 53 and the fourth wirings 54. Therefore, the perpendicular wirings 5 have a resistance lower than that of the parallel wirings 6. The coils (C) can be reduced in resistance. The perpendicular wirings 5 and the parallel wirings 6 are substantially equal to each other in width.

When there are multiple first wirings 51, the first wirings 51 are formed substantially parallel to each other. When there are multiple second wirings 52, the second wirings 52 are formed substantially parallel to each other. The first wirings 51 and the second wirings 52 are formed substantially parallel to each other. When the motor 10 is manufactured using the coil substrate 201 of the embodiment, an angle between a rotation direction (MR) of the motor illustrated in FIG. 1B and the first wirings 51 is substantially 90 degrees.

When there are multiple third wirings 53, the third wirings 53 are formed substantially parallel to each other. When there are multiple fourth wirings 54, the fourth wirings 54 are formed substantially parallel to each other. The third wirings 53 and the fourth wirings 54 are formed substantially parallel to each other. An angle between the third wirings 53 and the first wirings 51 is substantially 90 degrees.

Figure 1D:
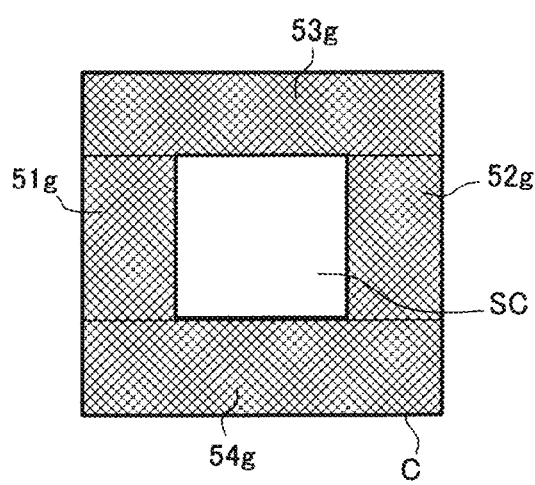

In FIG. 1D, the wirings (w) are grouped. By grouping the first wirings 51, a first wiring group (51g) is formed. By grouping the second wirings 52, a second wiring group (52g) is formed. By grouping the third wirings 53, a third wiring group (53g) is formed. By grouping the fourth wirings 54, a fourth wiring group (54g) is formed. The first wiring group (51g) and the second wiring group (52g) can be referred to as perpendicular wiring groups (5g). The third wiring group (53g) and the fourth wiring group (54g) can be referred to as parallel wiring groups (6g).

By winding the coil substrate 201, the motor coil substrate 20 of the embodiment is obtained. In this case, the coil substrate 201 is wound such that the portions (P) each form substantially one winding. The j-th portion is wound on an outer side of the (j−1)-th portion. The number j is an integer equal to or larger than 2. The coil substrate 201 is wound, for example, in a tubular shape. An example of a method for winding the coil substrate 201 is described using FIG. 2F. When the coil substrate 201 of FIG. 2A is wound, as illustrated in FIG. 2F, the first portion (P1) forms substantially one winding. Further, the second portion (P2) connected to the first portion (P1) forms substantially one winding. In this case, the first portion (P1) is wound on the innermost side. The flexible substrate 22 forming the first portion (P1) is an inner peripheral flexible substrate (22I). Then, the second portion (P2) is wound on an outer side of the first portion (P1). The flexible substrate 22 forming the second portion (P2) forms an outer peripheral flexible substrate (22O). The outer peripheral flexible substrate (22O) extends from the inner peripheral flexible substrate (22I).

When K is 3, the coil substrate 201 is formed of the first portion (P1), the second portion (P2), and a third portion (P3). Then, the third portion (P3) connected to the second portion (P2) forms substantially one winding. The third portion (P3) is wound on an outer side of the second portion (P2).

The inner peripheral flexible substrate (22I) and the coils (C) on the inner peripheral flexible substrate (22I) form an inner peripheral coil substrate (201I). The outer peripheral flexible substrate (22O) and the coils (C) on the outer peripheral flexible substrate (22O) form an outer peripheral coil substrate (201O).

In the motor coil substrate 20, the coils (inner peripheral coils) (C) in the inner peripheral coil substrate (201I) and the coils (outer peripheral coils) in the outer peripheral coil substrate (201O) partially overlap each other. At least one outer peripheral coil is positioned above one inner peripheral coil. One inner peripheral coil and one outer peripheral coil positioned above the inner peripheral coil form a laminated coil. One inner peripheral coil and one outer peripheral coil that form a laminated coil partially overlap each other. One inner peripheral coil and at least one outer peripheral coil partially overlap each other. An inner peripheral coil can be referred to as a lower coil. An outer peripheral coil can be referred to as an upper coil. An example of a laminated coil is illustrated in FIGS. 2F, 2D, and 2E. FIG. 2F is a cross-sectional view of the motor coil substrate 20 of the embodiment. The third wirings 53 among the parallel wirings 6 are drawn in FIG. 2F. FIG. 2D is a projection view of the coils (C) forming the motor coil substrate 20. In the example of FIGS. 2F, 2D, and 2E, the first on-first-surface coil (C11) is an inner peripheral coil, and the third on-first-surface coil (C13) is an outer peripheral coil. The first on-first-surface coil (C11) and the third on-first-surface coil (C13) form a laminated coil. The second on-first-surface coil (C12) is formed on the inner peripheral flexible substrate (22I) and the outer peripheral flexible substrate (22O). The first on-first-surface coil (C11) and the third on-first-surface coil (C13) are drawn in FIGS. 2D and 2E. The wirings (w) of the coils (C) are drawn using wiring groups.

FIG. 2B illustrates a portion of the coil substrate 201. In FIG. 2B, the first on-first-surface coil (C11) is drawn using wiring groups. FIG. 2B is a plan view. The coil substrate 201 of FIG. 2B is formed by the on-first-surface coils (CF). When the coil substrate 201 has the on-second-surface coils (CS), the on-second-surface coils (CS) are respectively positioned directly below the on-first-surface coils (CF). The on-first-surface coils (CF) and the on-second-surface coils (CS) have the same planar shape.

FIG. 2C includes b1 illustrating a cross section between b1 and b1 in FIG. 2B and b2 illustrating a cross section between b2 and b2 in FIG. 2B.

As illustrated in b1 of FIG. 2C, the first wirings 51 and the second wirings 52 have a thickness (t1). The third wirings 53 and the fourth wirings 54 have a thickness (t4). The thickness (t1) is substantially twice the thickness (t4). The thickness (t1) is larger than the thickness (t4).

FIGS. 2D and 2E illustrate a laminated coil formed by the first on-first-surface coil (C11) and the third on-first-surface coil (C13). FIGS. 2D and 2E illustrate overlapping of the coils (C) forming the laminated coil. The inner peripheral coil and the outer peripheral coil partially overlap each other. As illustrated in FIG. 2D, the perpendicular wirings 5 of the upper coil are positioned above the center space (SC) of the lower coil. The perpendicular wirings 5 of the lower coil are positioned below the center space (SC) of the upper coil. And, in one laminated coil, the perpendicular wirings 5 of the upper coil and the perpendicular wirings 5 of the lower coil do not overlap each other. The third wirings 53 of the upper coil are positioned above the third wirings 53 of the lower coil. The third wiring group (53g) of the upper coil is positioned above the third wiring group (53g) of the lower coil. The fourth wirings 54 of the upper coil are positioned above the fourth wirings 54 of the lower coil. The fourth wiring group (54g) of the upper coil is positioned above the fourth wiring group (54g) of the lower coil.

As illustrated in FIGS. 2D and 2E, the perpendicular wirings 5 of the upper coil forming one laminated coil and the perpendicular wirings 5 of the lower coil forming the one laminated coil do not overlap each other. The third wirings 53 of the upper coil forming one laminated coil and the third wirings 53 of the lower coil forming the one laminated coil overlap each other. The fourth wirings 54 of the upper coil forming one laminated coil and the fourth wirings 54 of the lower coil forming the one laminated coil overlap each other. In this way, in one laminated coil, how the parallel wirings 6 overlap and how the perpendicular wirings 5 overlap are different from each other. The number of overlaps of the parallel wirings 6 is larger than the number of overlaps of the perpendicular wirings 5. The number of overlapping parallel wirings 6 is larger than the number of overlapping perpendicular wirings 5. The number of overlapping parallel wiring groups (6g) is larger than the number of overlapping perpendicular wiring groups (5g). The number of overlapping parallel wirings 6 is twice the number of overlapping perpendicular wirings 5. In the example of FIG. 2E, two parallel wirings 6 overlap and a perpendicular wiring 5 does not overlap. In the example of FIG. 2E, the number of overlapping parallel wirings 6 is 2, and the number of overlapping perpendicular wirings 5 is 1. And, a thickness (t1) of the perpendicular wirings 5 is larger than a thickness (t4) of the parallel wirings 6. Therefore, in one laminated coil, a sum of the thicknesses of the overlapping parallel wirings 6 and a sum of the thicknesses of the overlapping perpendicular wirings 5 are substantially equal to each other. A sum of thicknesses of the overlapping parallel wiring groups (6g) and a sum of thicknesses of the overlapping perpendicular wiring groups (5g) are substantially equal to each other. Therefore, surface unevenness of the motor coil substrate 20 manufactured by winding the coil substrate 201 can be reduced. Roundness of the motor coil substrate 20 can be increased. The motor coil substrate 20 smoothly rotates. When the motor coil substrate 20 rotates, energy loss can be reduced. Eccentricity is unlikely to occur.

FIG. 7 of Japanese Patent Application Laid-Open Publication No. 2019-140762 illustrates a positioning of coils.

According to FIG. 7, two coils partially overlap each other. Among the two coils, one is referred to as a coil (A) and the other is referred to as a coil (B). A laminated coil is formed by the coil (A) and the coil (B). In some portions of the laminated coil, wirings forming the coil (A) and wirings forming the coil (B) overlap each other. In some other portions of the laminated coil, the wirings forming the coil (A) and the wirings forming the coil (B) do not overlap each other. Therefore, it is thought that the some portions are thicker than the other portions. It is thought that unevenness is formed on a surface of the motor coil substrate.

A coil substrate according to an embodiment of the present invention includes: a flexible substrate having one end and the other end on the opposite side with respect to the one end; and multiple coils formed on the flexible substrate. The coils are formed in substantially one row between the one end and the other end. A direction from the one end toward the other end is a row direction. The coils are each formed of a center space and wirings surrounding the center space. The wirings forming each of the coils include wirings (parallel wirings) that are substantially parallel to the row direction and wirings (perpendicular wirings) that are substantially perpendicular to the row direction. A thickness of the perpendicular wirings is larger than a thickness of the parallel wirings.

According to an embodiment of the present invention, the coils are each formed of a center space and wirings formed around the center space. The wirings forming each of the coils include wirings (parallel wirings) that are substantially parallel to the row direction and wirings (perpendicular wirings) that are substantially perpendicular to the row direction. The perpendicular wirings have a thickness larger than that of the parallel wirings. Resistance of the perpendicular wirings can be reduced. Resistance of the coils can be reduced. A highly efficient coil substrate can be provided.

The motor coil substrate is formed by winding the coil substrate. The motor coil substrate has an inner peripheral flexible substrate and an outer peripheral flexible substrate. A coil on the inner peripheral flexible substrate (an inner peripheral coil) and a coil on the outer peripheral flexible substrate (an outer peripheral coil) partially overlap each other. The overlapping inner peripheral coil and outer peripheral coil form a laminated coil. The parallel wirings of the inner peripheral coil (lower coil) and the parallel wirings of the outer peripheral coil (upper coil) overlap each other. On the other hand, the perpendicular wirings of the outer peripheral coil are positioned above the center space of the inner peripheral coil. Therefore, the perpendicular wirings of the inner peripheral coil and the perpendicular wirings of the outer peripheral coil do not overlap each other. In the embodiment, the perpendicular wirings have a thickness larger than that of the parallel wirings. Therefore, in the laminated coil, the thickness of the parallel wirings (a sum of the thickness of the parallel wirings of the inner peripheral coil and the thickness of the parallel wirings of the outer peripheral coil), the thickness of the perpendicular wirings of the inner peripheral coil, and the thickness of the perpendicular wirings of the outer peripheral coil are substantially equal to each other. Therefore, unevenness on a surface of the motor coil substrate can be reduced. The motor coil substrate can have a substantially uniform diameter.

Obviously, numerous modifications and variations of the present invention are possible in light of the above teachings. It is therefore to be understood that within the scope of the appended claims, the invention may be practiced otherwise than as specifically described herein.

What is claimed is:

1. A coil substrate, comprising:
a flexible substrate having a first end and a second end on an opposite side with respect to the first end; and
a plurality of coils formed on the flexible substrate in substantially one row between the first end and the second end of the flexible substrate such that each of the coils has a center space and a plurality of wirings surrounding the center space,
wherein the plurality of wirings in each of the coils includes a plurality of parallel wirings formed substantially parallel to a row direction extending from the first end toward the second end and a plurality of perpendicular wirings formed substantially perpendicular to the row direction, and the plurality of coils is formed such that a thickness of the perpendicular wirings is greater than a thickness of the parallel wirings.

2. The coil substrate according to claim 1, wherein the plurality of coils is formed such that a length of each of the perpendicular wirings is substantially equal to a length of the center space.

3. The coil substrate according to claim 1, wherein the plurality of coils is formed such that the plurality of perpendicular wirings includes a plurality of first wirings and a plurality of second wirings and that the plurality of parallel wirings includes a plurality of third wirings and a plurality of fourth wirings, and the plurality of wirings is formed such that the plurality of first wirings has a plurality of upper ends and a plurality of lower ends on an opposite side with respect to the upper ends respectively, that the plurality of second wirings has a plurality of upper ends and a plurality of lower ends on an opposite side with respect to the upper ends respectively, that the third wirings electrically connect the upper ends of the first wirings and the upper ends of the second wirings respectively, that the fourth wirings electrically connect the lower ends of the first wirings and the lower ends of the second wirings respectively, that the plurality of first wirings faces the plurality of second wirings via the center space, and that the plurality of third wirings faces the plurality of fourth wirings via the center space.

4. The coil substrate according to claim 3, wherein the plurality of coils is formed such that each of the coils has a planar shape of substantially rectangular.

5. The coil substrate according to claim 1, wherein the plurality of coils includes a U-phase coil, a V-phase coil, and a W-phase coil.

6. A motor coil substrate, comprising:
the coil substrate of claim 1 wound such that when a motor is assembled by positioning a motor coil substrate around a magnet, an angle between a rotation direction of the motor and the plurality of perpendicular wirings is substantially 90 degrees.

7. The motor coil substrate according to claim 6, wherein the coil substrate is wound such that the plurality of perpendicular wirings of an upper coil of the coils is positioned above the center space of a lower coil of the coils.

8. The motor coil substrate according to claim 7, wherein the coil substrate is wound such that the plurality of parallel wirings of the upper coil is positioned above the plurality of parallel wirings of the lower coil.

9. The motor coil substrate according to claim 7, wherein the flexible substrate includes an inner peripheral flexible substrate and an outer peripheral flexible substrate extending from the inner peripheral flexible substrate, and the outer peripheral flexible substrate is wound around the inner peripheral flexible substrate such that the lower coil is formed on the inner peripheral flexible substrate and that the upper coil is formed on the outer peripheral flexible substrate.

10. The motor coil substrate according to claim 9, wherein the coil substrate is wound such that the plurality of parallel wirings of the upper coil is positioned above the plurality of parallel wirings of the lower coil.

11. The coil substrate according to claim 1, wherein the plurality of coils is formed such that a thickness of the plurality of perpendicular wirings is substantially twice a thickness of the plurality of parallel wirings.

12. The coil substrate according to claim 2, wherein the plurality of coils is formed such that the plurality of perpendicular wirings includes a plurality of first wirings and a plurality of second wirings and that the plurality of parallel wirings includes a plurality of third wirings and a plurality of fourth wirings, and the plurality of wirings is formed such that the plurality of first wirings has a plurality of upper ends and a plurality of lower ends on an opposite side with respect to the upper ends respectively, that the plurality of second wirings has a plurality of upper ends and a plurality of lower ends on an opposite side with respect to the upper ends respectively, that the third wirings electrically connect the upper ends of the first wirings and the upper ends of the second wirings respectively, that the fourth wirings electrically connect the lower ends of the first wirings and the lower ends of the second wirings respectively, that the plurality of first wirings faces the plurality of second wirings via the center space, and that the plurality of third wirings faces the plurality of fourth wirings via the center space.

13. The coil substrate according to claim 12, wherein the plurality of coils is formed such that each of the coils has a planar shape of substantially rectangular.

14. The coil substrate according to claim 2, wherein the plurality of coils includes a U-phase coil, a V-phase coil, and a W-phase coil.

15. A motor coil substrate, comprising:
the coil substrate of claim 2 wound such that when a motor is assembled by positioning a motor coil substrate around a magnet, an angle between a rotation direction of the motor and the plurality of perpendicular wirings is substantially 90 degrees.

16. The motor coil substrate according to claim 15, wherein the coil substrate is wound such that the plurality of perpendicular wirings of an upper coil of the coils is positioned above the center space of a lower coil of the coils.

17. The motor coil substrate according to claim 16, wherein the coil substrate is wound such that the plurality of parallel wirings of the upper coil is positioned above the plurality of parallel wirings of the lower coil.

18. The motor coil substrate according to claim 16, wherein the flexible substrate includes an inner peripheral flexible substrate and an outer peripheral flexible substrate extending from the inner peripheral flexible substrate, and the outer peripheral flexible substrate is wound around the inner peripheral flexible substrate such that the lower coil is formed on the inner peripheral flexible substrate and that the upper coil is formed on the outer peripheral flexible substrate.

19. The motor coil substrate according to claim 18, wherein the coil substrate is wound such that the plurality of parallel wirings of the upper coil is positioned above the plurality of parallel wirings of the lower coil.

20. The coil substrate according to claim 2, wherein the plurality of coils is formed such that a thickness of the plurality of perpendicular wirings is substantially twice a thickness of the plurality of parallel wirings.

* * * * *